US008971586B2

(12) United States Patent
Gomas et al.

(10) Patent No.: US 8,971,586 B2
(45) Date of Patent: *Mar. 3, 2015

(54) APPARATUS AND METHOD FOR ESTIMATION OF LIVESTOCK WEIGHT

(71) Applicants: Steve Gomas, Danville, CA (US); John Sweeney, Alamo, CA (US); Edward Theil, Oakland, CA (US)

(72) Inventors: Steve Gomas, Danville, CA (US); John Sweeney, Alamo, CA (US); Edward Theil, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/207,206

(22) Filed: Mar. 12, 2014

(65) Prior Publication Data
US 2014/0193043 A1 Jul. 10, 2014

Related U.S. Application Data

(63) Continuation of application No. 13/095,800, filed on Apr. 27, 2011, now Pat. No. 8,755,570.

(51) Int. Cl.
| G06K 9/00 | (2006.01) |
| G06T 7/00 | (2006.01) |
| G06K 9/62 | (2006.01) |
| G06K 9/48 | (2006.01) |

(52) U.S. Cl.
CPC ............ G06T 7/0004 (2013.01); G06K 9/6209 (2013.01); G06K 9/48 (2013.01); G06K 9/6214 (2013.01); G06T 7/0083 (2013.01); G06T 7/0089 (2013.01); G06T 2207/10004 (2013.01); G06T 2207/30128 (2013.01)
USPC ........... 382/110; 426/573; 426/577; 426/575; 426/271

(58) Field of Classification Search
CPC ................................. C01G 17/08; G06K 9/00
USPC .......................... 426/529, 575, 573, 271, 577
See application file for complete search history.

(56) References Cited

U.S. PATENT DOCUMENTS

| 4,963,035 | A | * | 10/1990 | McCarthy et al. | ............ 382/110 |
| 5,474,085 | A | * | 12/1995 | Hurnik et al. | ................. 600/587 |
| 5,576,949 | A | * | 11/1996 | Scofield et al. | ............... 702/179 |
| 6,104,827 | A | * | 8/2000 | Benn et al. | ..................... 382/110 |
| 6,123,451 | A | * | 9/2000 | Schaefer et al. | ................ 374/45 |
| 6,549,289 | B1 | * | 4/2003 | Ellis | .............................. 356/603 |
| 7,128,024 | B2 | * | 10/2006 | Doyle, II | ....................... 119/518 |
| 7,711,156 | B2 | * | 5/2010 | Kim et al. | ..................... 382/118 |
| 7,764,835 | B2 | * | 7/2010 | Takakura et al. | ............. 382/168 |
| 2004/0032974 | A1 | * | 2/2004 | Kriesel | ......................... 382/110 |

(Continued)

OTHER PUBLICATIONS

C. Patrick Schofield, John A. Marchant,"Image analysis for estimating the weight of live animals","Optics in Agricufture (1990)".*

(Continued)

*Primary Examiner* — Stephen R Koziol
*Assistant Examiner* — Shaghayegh Azima
(74) *Attorney, Agent, or Firm* — Fitch, Even, Tabin & Flannery LLP

(57) ABSTRACT

A digital image of a target object is received and the image includes a plurality of pixels. The target object is at least a portion of an animal, and the portion of the animal is disposed in the image according to a predetermined disposition. The weight of the animal is determined using the model and at least one characteristic. At least some of the pixels of the image of animal are analyzed to determine at least one characteristic of the image of the animal. The weight of the animal is determined using the at least one characteristic.

18 Claims, 10 Drawing Sheets

(56) References Cited

U.S. PATENT DOCUMENTS

| | | |
|---|---|---|
| 2005/0211174 A1* | 9/2005 | Ellis .......................... 119/14.08 |
| 2008/0152191 A1* | 6/2008 | Fujimura et al. ............. 382/103 |
| 2009/0074253 A1* | 3/2009 | Peacock et al. .............. 382/110 |
| 2009/0274804 A1* | 11/2009 | Wilson et al. ................ 426/231 |
| 2010/0289879 A1* | 11/2010 | Sinzinger et al. .............. 348/46 |
| 2011/0054338 A1* | 3/2011 | Linker et al. ................. 600/529 |
| 2011/0196661 A1* | 8/2011 | Spicola et al. ................. 703/11 |
| 2012/0275659 A1 | 11/2012 | Gomas |
| 2013/0064432 A1* | 3/2013 | Banhazi et al. .............. 382/110 |

OTHER PUBLICATIONS

"Nabil Brandl a, Erik Jorgensen","Determination of live weight of pigs from dimensions measured using image analysis","Elsevier,Computers and Electronics in Agriculture 15 (1996) 57-72".*

C. Patrick Schofiled, John A. Marchant, "Image analysis for estimating the weight of live animals", Optics in Agriculture (1990) (11 pgs.).

Final office action from U.S. Appl. No. 13/095,800 mailed Jul. 26, 2013 (36 pgs.).

Nabil Brandl A, Erik Jorgensen, "Determination of live weight of pigs from dimensions measured using image analysis"; Elsevier, Computers and Electronics in Agriculture 15 (1996); pp. 57-72 (16 pgs.).

Non-final office action from U.S. Appl. No. 13/095,800 mailed Feb. 5, 2013 (32 pgs.).

Notice of Allowance from U.S. Appl. No. 13/095,800 mailed Dec. 12, 2013 (10 pgs.).

* cited by examiner

Directed Search Initialization

X (current state of the model) = $\{(x_1,y_1),...,(x_n,y_n)\}$

X\* (new estimate of the boundary points by gradient search) = $\{(x_1^*,y_1^*),...,(x_n^*,y_n^*)\}$ db: = (initially large magnitude)

P: matrix of the principal orthonormal eigenvectors

--- while ( |db| > tolerance)
    1. $dX^* = X^* - X$
    2. $db = P^T(dX^*)$
    3. $b \leftarrow b + db$
    4. $X \leftarrow X + P(b)$

*FIG. 3*

Example of Directed Search Convergence

Table 1: Exemplary Entries for Database", _207_ in Figure 2

| Record Name | Example Values |
| --- | --- |
| Animal ID | 12345678 |
| Animal Breed | Holstein, Jersey, Holstein-Jersey cross, Hereford, Angus, Berkshire, Hampshire, Clydesdale |
| Animal Birth date | 04-29-2007 |
| Animal Age in Days | 457 |
| Animal Sex | Female |
| Animal lactating | Yes |
| Animal lactating Duration in Days | 27 |
| Animal Last Date Bred | 06-03-2008 |
| Animal Pregnant | No |
| Animal Pregnant duration in Days | 0 |
| Animal Last weight in pounds | 1100 |
| Animal Last weigh date | 10-11-2008 |
|  |  |
|  |  |
|  |  |

*FIG. 10*

Table 2: Exemplary Entries for Database", _205_ in Figure 2

| Information Description | Source and Location |
| --- | --- |
| Animal Identification | Radio Frequency Identifier Device (RFID) or entered by operator |
| Specific Animal Information | From Animal Parameter Database, see Table 1. Stored on device or retrieved from server via network connection |
| Breed Specific Information: may include color markings, local landmark information, previous wgt. (if any), coefficients for weight information | Breed Database; stored on device or retrieved from server via network connection |

APPARATUS AND METHOD FOR ESTIMATION OF LIVESTOCK WEIGHT

CROSS-REFERENCE TO RELATED APPLICATIONS

This application claims the benefit of the priority date and is a continuation of Ser. No. 13/095,800, filed Apr. 27, 2011, which is hereby incorporated in its entirety by reference.

FIELD OF THE INVENTION

This application generally relates to providing for the health and maintenance of domestic farm animals and, more specifically, to image processing approaches that achieve these goals.

BACKGROUND OF THE INVENTION

The determination of the live weight of farm and ranch animals is an important aspect of their health maintenance as well as in the successful conduct of many modern agricultural enterprises. That task, however, is not simple or easy to accomplish. For instance, most ranch animals are large and not particularly easy to manage in confined spaces. Scales robust enough to accommodate an individual livestock animal are expensive and not very portable in use. As a consequence, it is rare that individual animals actually are weighed.

The problems mentioned above have resulted in the development of several different "weighing aids", such as tables of pertinent values and tape measures that incorporate such tables. For example, tables of correspondences between chest girth of cattle and their live weight have been published. These approaches have been incorporated into Tyvek® or cloth tapes for measuring chest girth and these hand-held aids can be purchased and have been widely used.

Even with the availability of such tapes and tables, this indirect weight determination of an animal, such as a dairy or beef cow, is usually a difficult activity and not performed very often. For instance, the person weighing the animal must wedge him or herself between animals in a stanchion barn and risks injury when attempting to take a measurement. Also, these previous approaches increase both the time involved and the level of inconvenience, requiring accurate manual measuring and transcription of data by hand.

Some previous systems incorporated a laser rangefinder under controlled conditions that was used to correlate several linear dimensional measurements of livestock with their live weight. However, the elaborate equipment and controlled conditions preclude their use as an everyday tool on a farm or ranch.

Nevertheless, in modern agricultural operations (e.g., large dairy or beef cattle ranches or feedlots) there is a desire to determine live weight as compared to previous eras, with the increased use of antibiotics and the potential for residual drugs in carcasses. Increasingly, such large enterprises operate with automated recordkeeping for efficiency and to help maintain healthy animals. Livestock may be tagged or implanted with bar codes or Radio Frequency Identifier Devices (RFID) for automated wireless data entry into databases that provide an improved level of detailed record-keeping and the ability to track each animal from birth onwards, as well as storing information on the entire herd.

Live weight is also an implicit factor in determining the Body Condition Score (BCS) for cattle. This ranking system, which helps to identify problem cows, has not explicitly incorporated weight trends into its animal histories, largely because they have not been readily available. Because BCS has become integrated into ranch management systems, individual weight histories will become more common and useful if they are easily available.

In addition, both State and Federal Departments of Agriculture and Health are increasingly concerned about food safety and environmental impacts. These agencies exercise supervision by establishing standards and regulations for the environments in which these animals live. Not only can a record of weights contribute to an animal's health over a period of years, but it is an important factor in determining the appropriate dosage of medication at various stages in the animal's life. Pharmaceutical manufacturers typically recommend dosing pharmaceuticals based on an animal's weight. An accurate dosage based on weight leads to more effective treatment. Under-dosing or over-dosing an animal can cause side effects, may not improve the animal's health, and can lead to residues of pharmaceuticals, such as antibiotics, in the animal's milk or at slaughter.

BRIEF DESCRIPTION OF THE DRAWINGS

FIG. 3 comprises an outline in pseudo-code of a Directed Search approach used in determining the live weight of an animal according to various embodiments of the present invention;

FIGS. 10 and 11 exemplify the data that may be stored in the databases of an overall management system according to various embodiments of the present invention.

Figure 1:
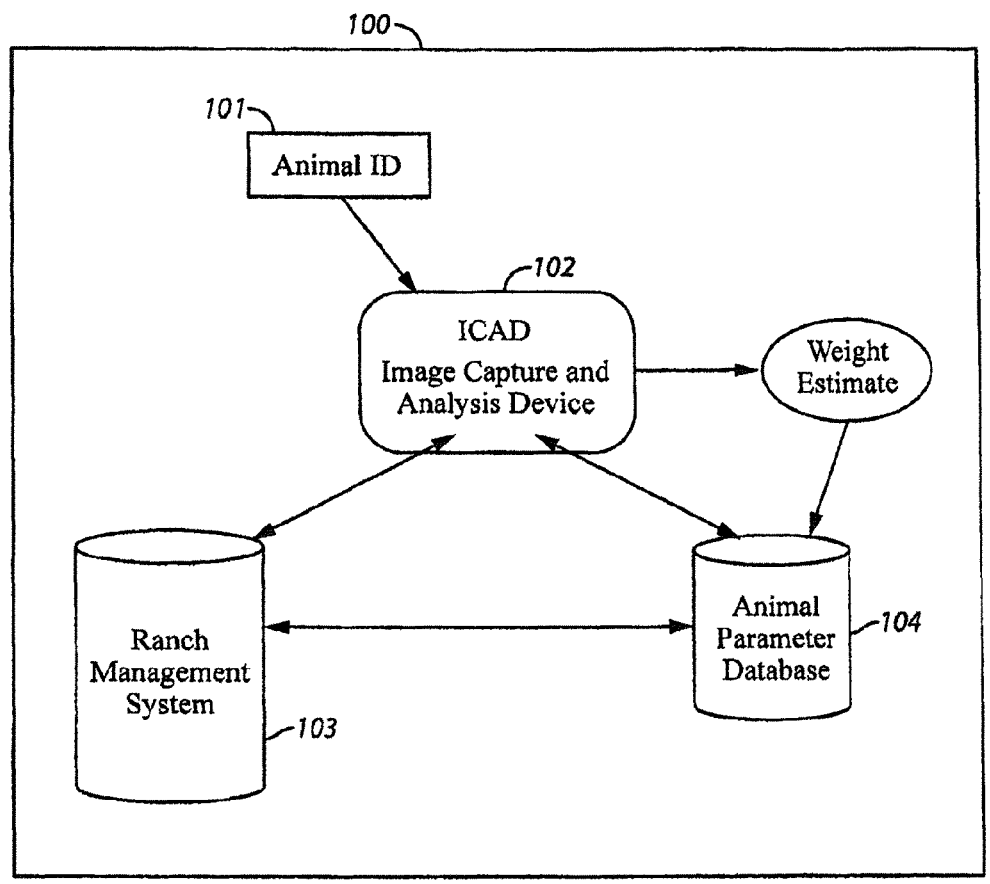
FIG. 1 comprises a block diagram illustrating a system for the determination of live weights of animals, according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

The weight of animals (e.g., large farm or ranch animals) is efficiently and automatically estimated by means of a simple image acquisition device, such as a programmable, digital still camera, or a digital video camera, together with image analysis methods. A system suitable for either stand-alone processing or for integration into a computerized farm or ranch management system includes a module that can be either embedded in such an image acquisition device or in a conventional computer which itself may be a host in a local area network. In one example, the image analysis includes: identifying the location of the animal in the image; determining its body outline via landmarks and related feature extraction; deriving several quantities that, taken together, are correlated closely with the animal's weight and establishing a statistical relationship between those quantities and the weight.

The present approaches provide an inexpensive and portable means of estimating live weight of farm and ranch animals to within a practical degree of accuracy. The live weights can be estimated in the field. The approaches described herein are capable of interfacing with computer-based farm and management systems, yet also provide simple and largely automatic operation by relatively untrained personnel, and are sufficiently accurate to gain the confidence of users (e.g., ranchers, farmers, veterinarians, and others involved in agricultural enterprises). Additionally, the present approaches typically employ off-the-shelf cameras and do not require a range finder or stereoscopy equipment, which are expensive and sometimes bulky. The present approaches can be implemented as a stand-alone device in which weight estimates are read out in a variety of forms or as part of an integrated ranch/farm management system.

For purposes of illustration, the descriptions made herein utilize dairy cattle as the type of livestock for which a weight is determined. However, it will be appreciated that the principles and approaches described herein are not limited to a particular species of animal, a particular breed of animal, or a particular purpose or end-use of animal, nor are they exclusive of large farm animals. To the contrary, these approaches can be applied to any type of animal of any size, shape, weight, or other characteristic.

Digital image analysis approaches, such as the use of principal component analysis; edge-detection; image analysis for describing and detecting shapes; image analysis combined with programmable cameras and heuristics appropriate to the animal and the image all contribute to the development of a practical device and system are utilized. By using ratios of pixel counts of commensurable animal features, the present approaches avoid the use of range-finding equipment or absolute-size calibration. By employing approaches for image object recognition with general knowledge of the animal's morphology, appearance (e.g., color and markings) and age, measurements correlated with the animal's weight can be determined. By testing these methods on a training set of representative animals that have been weighed with a large animal scale, the coefficients that effect the mathematical expression for that correlation for various breeds and age groups can be determined. By employing small, inexpensive digital still or video cameras, the approaches described herein are portable and simple to use. By integrating the live weight estimates with already existing standard ranch management systems and databases of breed characteristics through the use of wireless communications and current database technology, the approaches described herein are implemented as a practical, automated system.

Various detection approaches may be used. For example, such approaches may manually construct outlines using an interactive approach with computer tools; may include "active snakes contours;" or may utilize perceptrons or other neural networks and non-linear modeling. Other methods for weight estimation may include the use of Adaptive Associative Memories or reliance on more traditional measurements of linear dimensions, using special equipment. Other detection approaches are possible.

In many of these embodiments, a digital image of a target object is received. The image includes a plurality of pixels. The target object is at least a portion of an animal and the portion of the animal is disposed in the image according to a predetermined disposition. At least some of the pixels of the image of animal are analyzed to determine at least one characteristic of the image of the animal. The weight of the animal is determined using the at least one characteristic.

In some aspects, the characteristic is a perimeter of an animal. In other aspects, a physical characteristic of the animal is received and the weight is determined using the at least one characteristic and the physical characteristic. The physical characteristic may related to various factors such as the age of the animal, the breed of the animal, animal markings, a previous weight, and identification tag information concerning the animal. In yet other aspects, a management service is notified of the determined weight.

In others of these embodiments, an apparatus for determining an animal weight includes an interface and a controller. The interface has an input and the input is configured to receive a digital image of a target object. The image includes a plurality of pixels and the target object is at least a portion of an animal. The portion of the animal is disposed in the image according to a predetermined disposition. The interface also has an output.

The controller is coupled to the interface. The controller is configured to identify the target object from the image and to determine at least one characteristic of the image of the animal. The controller is further configured to determine the weight of the animal using the at least one characteristic and present the weight at the output of the interface.

In others of these embodiments, a digital image of a target object is received and the image includes a plurality of pixels. The target object is at least a portion of an animal, and the portion of the animal is disposed in the image according to a predetermined disposition or position. A model representing expected visual perimeter of the animal in the predetermined disposition is constructed. The target object is identified from the image using the model and according to an analysis of at least some of the pixels in the image. The perimeter of the outline of the animal and an area enclosed by the perimeter are determined using the identified target information. At least one characteristic of an animal from a database is determined and the animal is the same species as the animal in the target image. The weight of the animal is determined using the perimeter and area information and the at least one other characteristic. In one aspect, the target image does not include or has associated with it actual dimensions or measurements.

In still other embodiments, the approaches utilize or determine the partial perimeter of the outline of the animal. In yet other embodiments, the perimeter or the outline of the animal is not utilized in the analysis (e.g., three co-linear points could be used).

As used herein, the term "perimeter" means the outermost visual path surrounding and defining the area of an animal (in the image) and the length of this path. For example, in a digital image of the posterior view of a cow, the perimeter is defined by a line that defines and encloses the legs, back, and other parts of this view of the cow. The perimeter includes this path and is the distance of the path as measured in any convenient unit of measure.

In some aspects, a determination is made as to whether false edges exist in the perimeter based at least in part from information in the data base. In other aspects, the data base comprises information related to a specific animal or species of animal. In yet other aspects, the characteristics may include the age of the animal, animal markings, a previous weight, and identification tag information. Other examples are possible.

In other aspects determining the perimeter includes finding the edges of the animal, determining the perimeter comprises creating a region of interest on the image, and/or performing a directed search of the image.

In still other aspects, these approaches may be integrated with management services. In this respect, the weight may be sent to these services, which may utilize the weight by performing further analysis of this information. For example, various reports may be prepared to allow users to manage animals according to the determined weight. Different actions may be taken including changing the feeding program of animals, applying medicine or drugs to particular animals (or groups of animals). As mentioned, reports can be prepared that illustrate, among other things, the weights of animals as changing with time or the weight of animals at particular locations.

In yet others of these embodiments, an apparatus for determining an animal weight, includes an interface and a controller. The interface has an input and the input is configured to receive a digital image of a target object. The image includes a plurality of pixels and the target object is at least a portion of an animal. The portion of the animal is disposed in the image according to a predetermined disposition and the interface also has an output. The input is further configured to receive at least one characteristic of an animal from a database and the animal is the same species as the animal in the target image. In one aspect, the target image does not include or has associated with it actual dimensions or measurements.

The controller is coupled to the interface and the controller is configured to construct a model. The model represents expected visual perimeter of the animal in the predetermined disposition. The controller is further configured to identify the target object from the image using the model and according to an analysis of at least some of the pixels in the image. The controller is also configured to determine the perimeter of the outline of the animal and an area enclosed by the perimeter using the identified target, to determine the weight of the animal using the perimeter, the area, and at least one other characteristic, and present the weight at the output of the interface.

In some aspects, searching for the target and breed information in the database may be performed to avoid the problem of false edges in some breeds (e.g., Holsteins and Jerseys) which otherwise would mislead automatic search for target outline. For example, approaches may include the use and analysis of the rear legs in a posterior view as landmarks on which to base computation for centering the initial model and choice of scale; choosing scale large enough for the model template to initially encompass the target image; or using a database that contains animal ages to supply an important variable for the estimation.

It will be appreciated that in many of the examples described herein, the perimeter of an outline of an animal is obtained from a digital image and this is used to calculate the weight of an animal. However, it will be appreciated that this is one particular implementation of determining the weight and that other specific implementations may also be used. For example, the partial perimeter may be determined and used. In still other examples, any number of co-linear points may be used.

Referring now to FIG. 1, one example of a system 100 is described in which an Image Capture and Analysis Device (ICAD) module 102 is integrated into the system 100 for agricultural management (or alternatively, as a stand-alone device for the estimation of animal weight), for example, in agricultural operations such as farms and ranches. For example, this larger management system may further analyze the determined weights and perform actions as a result of this analysis.

The system 100 includes a device 101 for identifying a particular animal by serial number or other physical identifier; the ICAD module 102; input from a third-party database 103 that provides additional information for each animal (as exemplified in FIG. 10); a second, Animal Parameters database 104 that may contain parameters used to specify the relationship between the quantitative analysis performed in the ICAD module 102 and the estimated weight of the animal (as exemplified in FIG. 11). The database 104 may also contain other data useful to the weight estimator, such as color markings and other distinctive traits. In some cases, the data bases 103 and 104 may be combined into a single data base.

It is to be understood that although various components are illustrated in the accompanying figures as separate entities, each illustrated component represents a collection of functionalities which can be implemented as software, hardware, firmware or any combination of these elements. The exact implementation may depend upon, among other things, the specific needs of the user and the system.

The device 101 may be a radio frequency identifier device (RFID) which can transmit information over short distances, an infra-red transmitter, a metallic tag with numerical information or bar codes, or any other device which contains identification information for an individual animal that may be transmitted to the ICAD module. Manual entry may also be used. This ID will then serve as a key into the databases and as an identifier for the images and analysis results generated by the ICAD module 102.

The ICAD module 102 contains the functionality needed to interpret, analyze, and transform images and to communicate with the databases which preferentially will reside at remote locations. The module 102 can be located locally (within the imaging device, suitable for real-time processing and readout) or remotely from the other components shown in FIG. 1. If the latter case, a user can monitor and control the processing operations of the module 102 at various stages of these processing operations. The ICAD module 102 can access prior information, including past weight estimates, as well as (in this example) calving and lactating data, from the database 103. The module 102 uses this information to either confirm the current weight estimate (e.g., to within a given tolerance) or else to flag it as problematic. The module 102 uses the appropriate parameters (e.g., with respect to breed and age group) and information about breed characteristics from the database 104 to analyze the image and produce the weight estimate.

The ICAD module 102 produces the current weight estimate from a digital image of the animal by utilizing image analysis techniques and information about the specific animal that helps avoid the difficulties that arise in analyzing the complex morphology of the animal. A choice of several different views of a given animal may be used for this purpose (e.g., overhead view, side view, front view, posterior view). As discussed herein and for illustration herein, a posterior view which includes the rear legs and most of the body (not including the head) is utilized. It will be appreciated that the views are not limited to this particular view, which, as mentioned, is used for illustration purposes. While different views are viable, once a view has been chosen for a herd or group of animals, it should be used consistently; different views will result in different sets of parameters and require different Training Sets as described elsewhere herein. Additionally, images should be consistent in their setting. For example, if one animal (e.g., a cow) is photographed while in a stanchion, all the cows should be photographed while in stanchions from roughly the same position.

As mentioned, the module 102 performs various functions. More specifically, the module 102 performs the construction of a Point Distribution Model (which only must be constructed once prior to the other steps being performed). The module 102 also performs the adaptation of the Active Shape Model. The module 102 additionally estimates weights of the livestock, given the outline of the target animal resulting from the first two steps.

Figure 2:
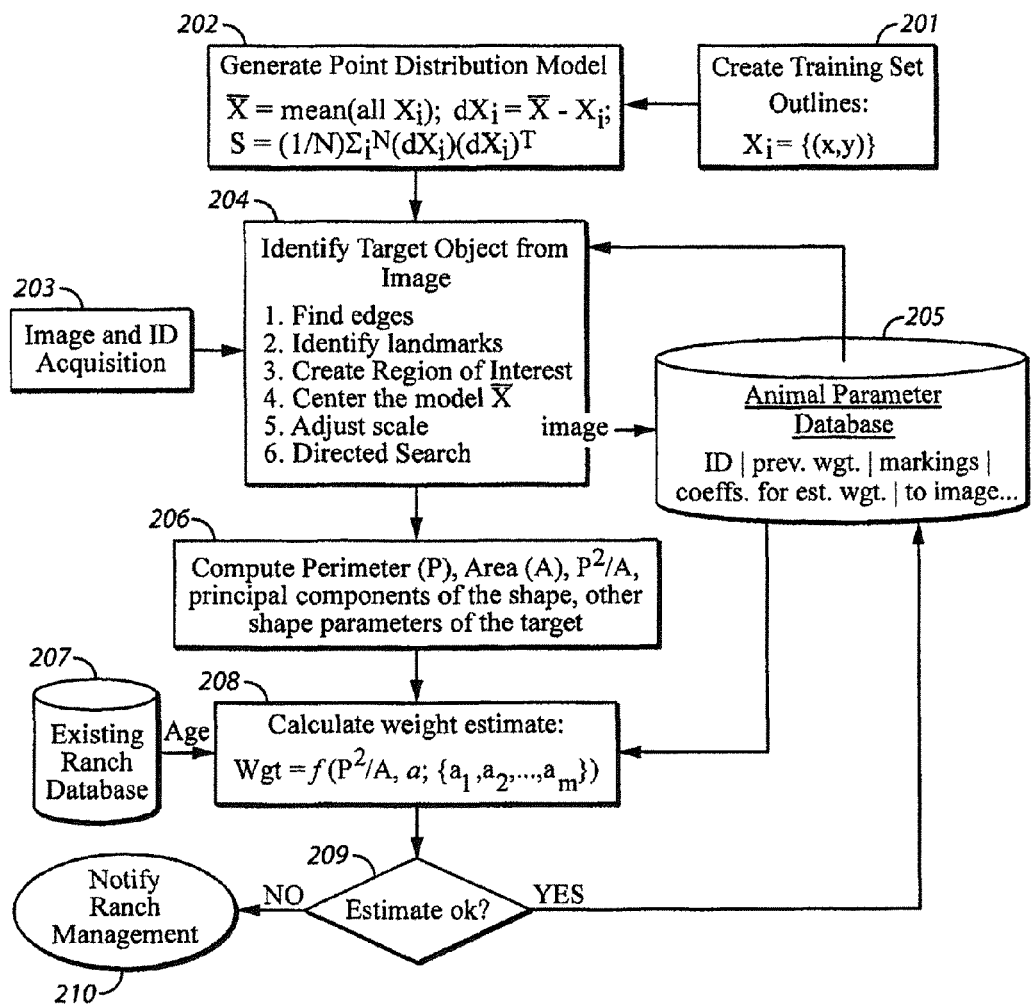
FIG. 2 comprises a diagram showing an approach for determining the live weight of an animal, according to various embodiments of the present invention.

Each of these steps will be described in turn, with reference primarily to FIG. 2. Referring now to FIG. 2, the process of generating a Point Distribution Model and the Active Shape Model (ASM) of computer recognition is generally described.

Generally speaking, ASMs provide a method of modeling the shapes of objects in digital images that reflect natural variation in shape and pose (i.e., scale, orientation and translation). By explicitly incorporating a variety of shapes in a training set of typical such objects and capturing the statistical variations among the members of the set, it is possible to create a model template that is essentially the mean (average) $\overline{X}$ of all the individual members of the set.

Figure 5:
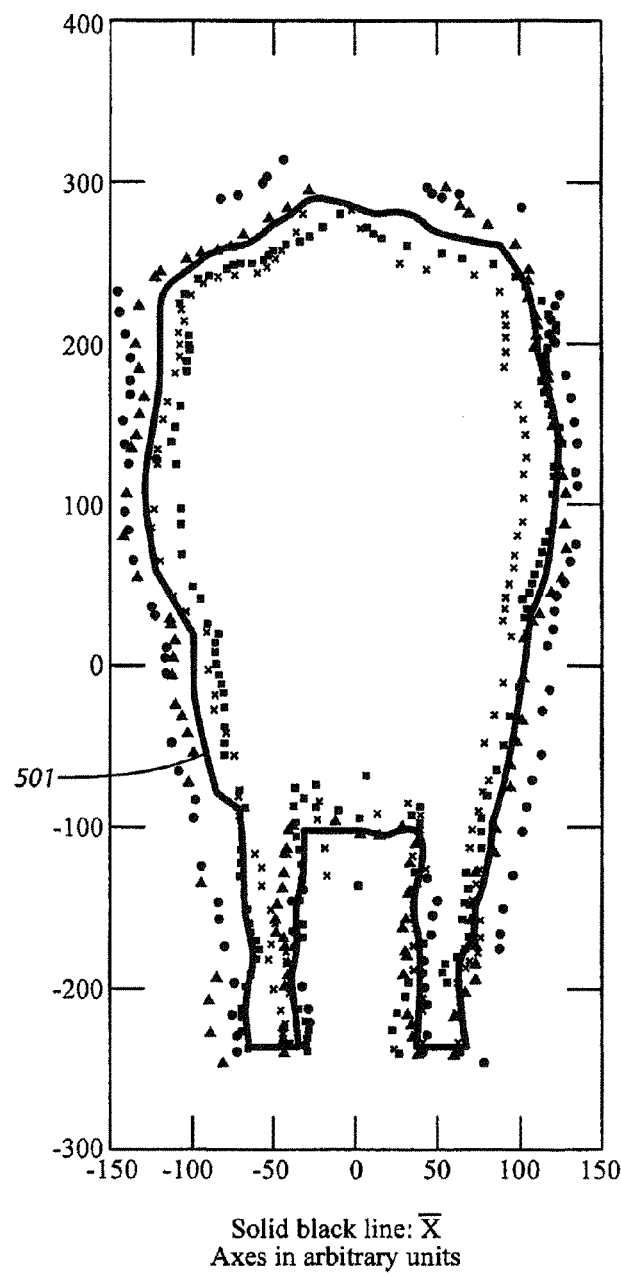
FIG. 5 comprises a sample mean model of a Point Distribution Model with three members of a training set that creates the model according to various embodiments of the present invention.

At step 201, the training set is created. As used herein, the term "training set" refers to a data/image set (showing animal edges and perimeters) of animals that have actually been weighed on a scale. In some aspects, a member of the training set may consist of a polygonal outline of an image of a cow, formed by placing a set of vertices of the polygon on the image, either manually, semi-automatically with computer assistance or fully automatically. Each outline may contain the same number of distinguished vertices and the vertices may be in consistent one-to-one correspondence from one image to another. An example of the average of outlines of posterior views of cows, together with the point clusters from some of the members of the associated training set, appears in FIG. 5. As also illustrated in FIG. 5, only three of the contributing outlines from the training set are included in the figure in order to improve legibility.

As mentioned, in some aspects the approaches utilize or determine the partial (not the entire) perimeter of the outline of the animal. In yet other examples, the perimeter or the outline of the animal is not utilized in the analysis (e.g., 3 co-linear points could be used).

$\overline{X}$ and the training set and its relevant statistics are collectively called a Point Distribution Model (PDM). Each individual outline shape of the PDM is represented by an ordered set of n points in the Cartesian plane: $X_j = \{(x_{1j}, y_{1j}), \ldots, (x_{nj}, y_{nj})\}$. $\overline{X}$ is then computed by forming the mean values for each pair $(x_{kj}, y_{kj})$ among all such members $X_j$ of the training set. Then the statistical variation among members of the training set is captured by calculating the covariance matrix S of the deviations of the individual outlines $X_j$ from $\overline{X}$.

At step 202, a point distribution model is created. Generally speaking, creating a PDM therefore includes of the following steps. First, the collection of outlines is aligned into a common reference frame with respect to scale, translation and rotation, all three of which may be represented by an affine transformation, T, $X_i = T(\text{outline}_i);$ Then, the mean of the $X_i$ is calculated on a point-by-point basis, $\overline{X} = \text{mean}(X_i);$ Then, the point-wise deviations are calculated:

$dX_i = \overline{X} - X_i;$ and then the covariance matrix S of the deviations is formed and this is expressed as $dX_i = \{dx_{i1}, \ldots, dx_{in}, dy_{i1}, \ldots, dy_{in}\}$ for all $X_i$:

$S = (1/N)\Sigma_i^N (dX_i)(dX_i)^T,$ where the indicated multiplication is the vector outer product and N is the number of members of the set. As mentioned, the training set may be constructed manually, by identifying a fixed collection of points that occupy the same relative positions on each object in different images. Alternatively, the collection of points may be constructed semi-automatically by applying a computer-generated rectangular or polar grid overlay on the image as an aid in always choosing the same points relative to the particular images. Another alternative is to generate the training shapes automatically. Also as mentioned, in the present approaches where weight determination is a final goal, the training set shall be inclusive enough to encompass a broad range of weights and ages of the animals.

Steps 201 and 202 need only be executed once in order to establish the PDM. For complex objects (e.g., livestock), many such points may be required to adequately represent an actual outline shape, resulting in a large number of degrees of freedom. To make the problem tractable, principal component analysis may be used to identify the first k principal components of S, where k is large enough to capture almost all the variation among the shapes in the training set. Typically, k<<n. New shapes not already in the training set can be generated as $X = \overline{X} + Pb$ where P is the n×k matrix of orthonormal eigenvectors obtained from the principal component analysis and b is a vector of control parameters $(b_1, b_2, \ldots, b_k)$. By varying the individual $b_j$, new shapes are created. A distinct advantage of this formulation, which is useful in these approaches, is that because P captures variations in natural shape as encapsulated in the matrix S, the new models X do not deviate from natural shapes either, within broad limits of the range of the components of b. That is, while many shapes are possible, formed by linear combinations of $\overline{X}$ and the control parameters b, non-natural shapes are rare, because of the constraints on b. As is well known by those skilled in the art, the constraints on b are related to the eigenvalues of S, which are the variances of the individual elements of b. Therefore, it is customary to restrict $b_j$ to a range of not more than 3*sqrt(the eigenvalue $\lambda_j$).

Figure 4:
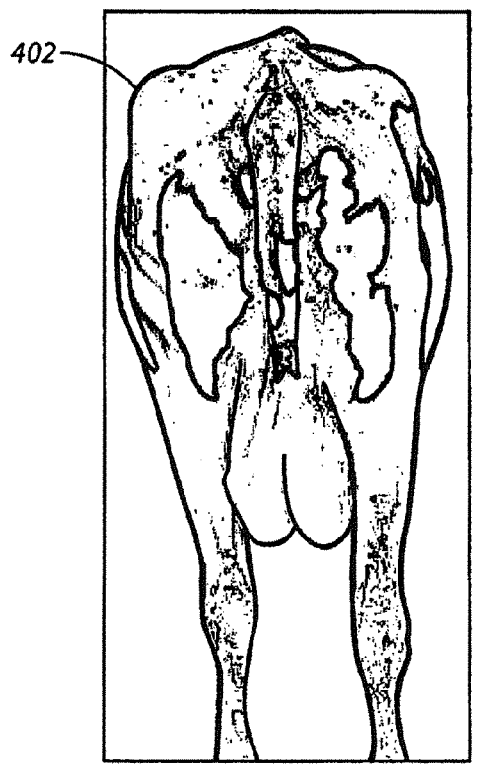
FIG. 4 comprises a posterior view of a cow after initial edge-detection showing various "false edges" due to the characteristic markings of the animal according to various embodiments of the present invention.

At step 203, the ICAD first acquires an image using an image acquisition device. A variety of imaging modalities may be used for this purpose, including digital video or the digital image resulting from a scanned photograph. The particular image format is not critical, but images are to be processed at a uniform resolution. Very high resolution is not required and also increases processing time. Preferably, lighting should be approximately uniform from image to image and the position of the imaging device should be such as to encompass the entire posterior view of the animal, as shown in FIG. 4. The device may be in a fixed position with respect to the target animal or it may be in a variable position. The image may be in color or grey-scale (commonly referred to as black-and-white).

At step 204, any edge detection approach as known in the art, may be used to obtain an image such as shown in FIG. 4 that includes edges. For example, an edge detection method such as described by J. Canny, "A Computational Approach to Edge Detection", IEEE Trans. PAMI, 8(6), pp 679-698 (1986) and a shape description and detection approach such as that described by T. F. Cootes, C. J. Taylor, D. H. Cooper, J. Graham, "Active Shape Models—Their Training and Application", Computer Vision and Image Understanding, 61:38-59, 1995 can be used. Both of these references are incorporated herein by reference in their entireties. Other approaches are found in U.S. Pat. Nos. 7,912,321, 7,899,256, and 7,889,193 all of which are also incorporated by reference herein in their entireties. Other examples are possible.

Also at step 204, landmarks of the target are identified. As used herein, the term "landmark" means readily identifiable and recognizable portions or areas of an object. In the present example for a posterior view, the legs are a key landmark. The search (e.g., a pixel-by-pixel or groups of pixels search) may start at the bottom of the image and move to either the left or right from the vertical line that passes through the center of the image. Alternatively, the search can start at either the left or right edge of the image and move away from that edge. The legs may contain edges that may vary in intensity due to lighting and detritus, but in all cases the true edges follow a generally vertical path part of the way up the image. There will be four such edges, appearing in pairs, each pair constituting one leg, as shown for example in FIG. 4. The direction of the edges may be determined by the gradient method frequently used in edge finding, as is generally understood by those skilled in the art, combined with principal component analysis. As is also known by those skilled in the art, the smaller of the two eigenvalues of the covariance matrix of points in a region will be close to zero if the points are approximately a straight line segment. The direction of the line may also be determined in the same manner The outline of the legs may be followed until they meet the upper part of the body of the target, as may be identified in part by the branching edge that crosses approximately horizontally from one leg to the other and outlines the udders.

In this example, once the general location of the legs has been determined the distance between them may be calculated relative to the same distance in the model template $\overline{X}$. Although the absolute anatomical lengths are not known in this embodiment, dimensions relative to the model template can be measured (e.g., in pixels).

By the same reasoning, pixels outside a computed horizontal band determined by the legs may also be ignored. By direct examination of the training set, the band may adequately extend 20% beyond the leftmost rightmost edges of the legs, respectively.

Also at step 204, a region of interest (ROI) is determined More specifically and by similar reasoning, the relative distance from the bottom of the image (near the heels of the animal) to the point where the legs meet the upper body at the udders provides a rough estimate (relative to $\overline{X}$) of the vertical scale of the target. Combining these two estimates creates a ROI, as illustrated in FIG. 4.

Figure 6:
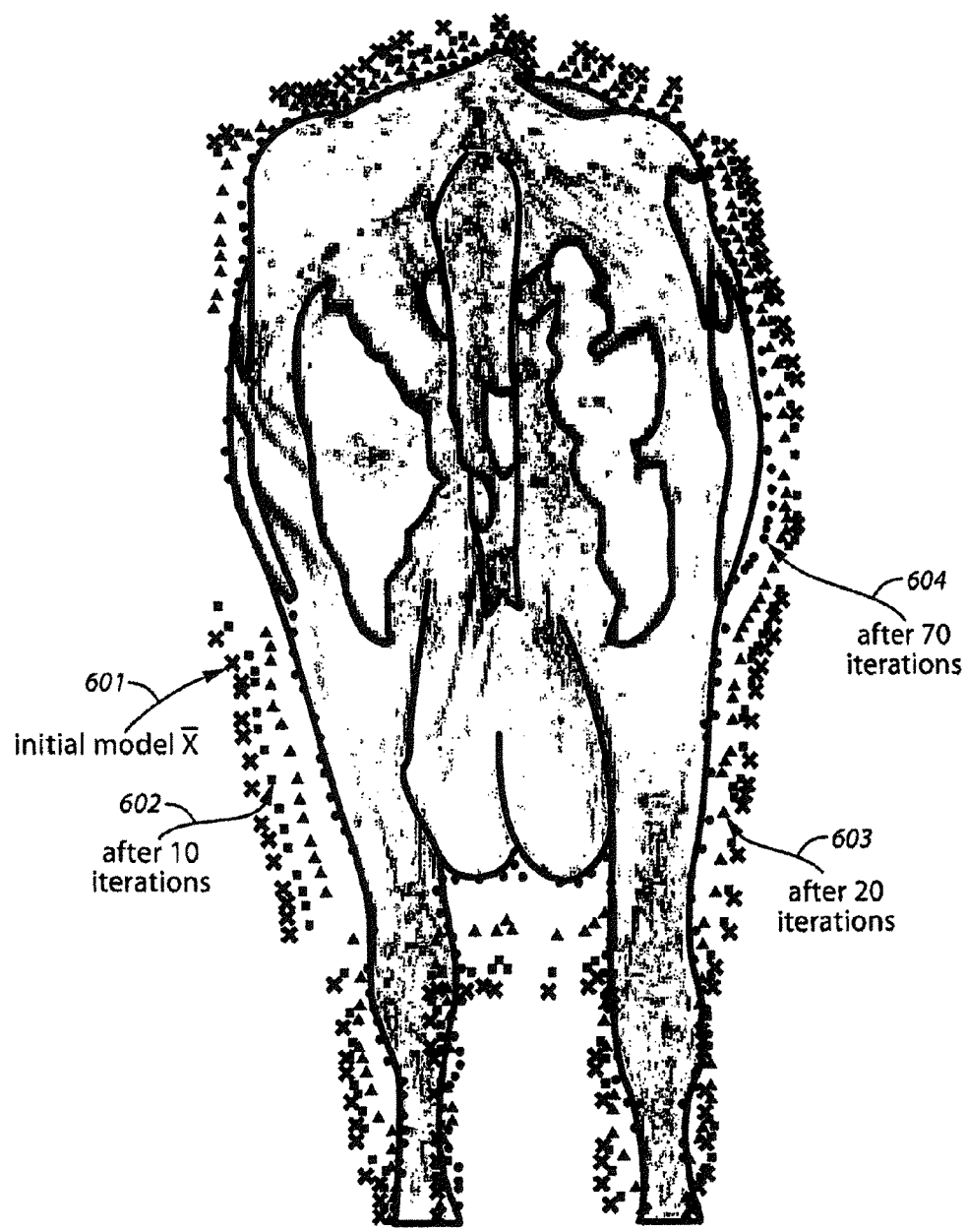
FIG. 6 comprises a chart illustrating Directed Search convergence, performed on the same image as in FIG. 4 according to various embodiments of the present invention.

Additionally at step 204, with the above information derived from locating the rear legs, the center of the PDM model template may be positioned so that its center may be overlaid at the approximate center of the ROI. FIG. 5 shows the PDM model template and FIG. 6 shows it overlaid on the target.

Also at step 204, a directed search using Active Shape Models may be initiated. There are several varieties of directed search using Active Shape Models. Two examples of such a search include U.S. Pat. Nos. 7,711,156 and 7,764,838, the contents of both of which are incorporated herein by reference in their entireties.

In one aspect, the present searches may search along lines normal to each of the vertices of the model, looking for pixels with strong edge values, such as pixels 402 in FIG. 4.

A choice of scale may also be made. Furthermore, because of the constraints imposed on the control vector b and the statistics in S, this search method may sense the existence of body markings as potential edges, but cannot reach them as boundary points.

Finally, the directed search is performed. The outcome or goal of this direction search is to determine with a high degree of certainty the outside perimeter of the animal.

FIG. 3 shows one example of pseudo-code that performs the directed search. More specifically, the first (initialization) action sets the current model X equal to $\overline{X}$. Then, the search in the neighborhood of vertices of X for candidate boundary points of the target yields a new model, X*. The difference, dX* between X and X* is used to create a new set of shape parameters, b+db, unless |db| is close to zero. If it is not, the iterative process of FIG. 3 is repeated.

Again, near a true boundary point of the target, the method may sense false edges created either by detritus or breed markings, but in all but very rare cases, the shape cannot distort to incorporate them because of the constraints on b discussed above.

FIG. 6 shows an example of the same image as in FIG. 4, but in this diagram four cycles of the Directed Search are overlaid on the image of the target. An initial outline $\overline{X}$ (601) is shown. Outlines 602 and 603 are obtained at around 10 and 20 iterations, respectively. In one example, after approximately 70 iterations an outline 604 is obtained and the approach has "found" the outline of the animal.

Referring again now to FIG. 2, at step 206, following the identification of boundary points of the target, the outline of the image is available. It will be appreciated that there are various methods for obtaining the outline. For example, as in this example, adjoining boundary vertices by line segments may be connected to form a polygonal outline as illustrated in FIG. 5 in the present embodiment. An alternative is to consider the boundary points as knots to anchor consecutive splines, to yield a more "natural" appearance. Whatever approach is employed, the approach advantageously is used consistently and in uniformity with the method that established the regression parameters stored in the Breed Database.

Also at step 206, the perimeter (P) of the outline and its enclosed area (A) are calculated, both of which are well understood and known to those skilled in the art. For example, the perimeter of the polygonal outline may be calculated by simply summing the Euclidean distances of the individual line segments that comprise the edges. Twice the area enclosed by said polygon may be calculated by the formula $\Sigma(x_i y_{i+1} - x_{i+1} y_i)$, where the sum is over all the vertices of the polygon $(x_i, y_i)$, taken in counter-clockwise order.

$P^2/A$ is the primary independent variable in estimating weight (W) in this embodiment. However, $P^2/A$ by itself is not sufficient; it is a quantity dependent only on shape and not on an animal's actual dimensions, which are not available in the present example. To compensate for the lack of physical dimensions, the approach uses age and breed as important factors in determining an animal's weight. Other compensating factors may also be used. Thus, information on age and breed are required from the databases 207 and 205 in FIG. 2. This collection of quantitative data is expressed in the form of parameters, grouped together here as a set. The set includes not only breed and age data but also the coefficients that specify the precise form of the function $f$ that appears in equation (1) described elsewhere herein.

In addition, other quantitative information that may be derived from the image analysis of each individual animal may appear explicitly in equation (1) described elsewhere herein. For example, principal component analysis of the covariance matrix of the boundary shape provides information about the relative dimensions of the image outline as a ratio of eigenvalues. For simplicity of exposition here, the results of any such computational analysis that may provide additional shape information is combined into a single multiplicative constant $\alpha$ which modifies the variable $P^2/A$ in (1), since that is the principal shape variable.

At step 208, the approach first uses the animal's ID to access its age and breed from the database systems 205 and 207. It also obtains the appropriate set of parameters $\{a_1, a_2, \ldots, a_m\}$ for that breed and age group, which have been previously determined by conventionally weighing representative members of the training set and formulating the relationship via regression between weight as the dependent variable and the determining factors discussed above. It uses these parameters to estimate the target animal's weight, according to the relationship:

$$W = f(P^2/A; \alpha\Box; \{a_1, a_2, \ldots, a_m\}) \quad (1)$$

Figure 7:
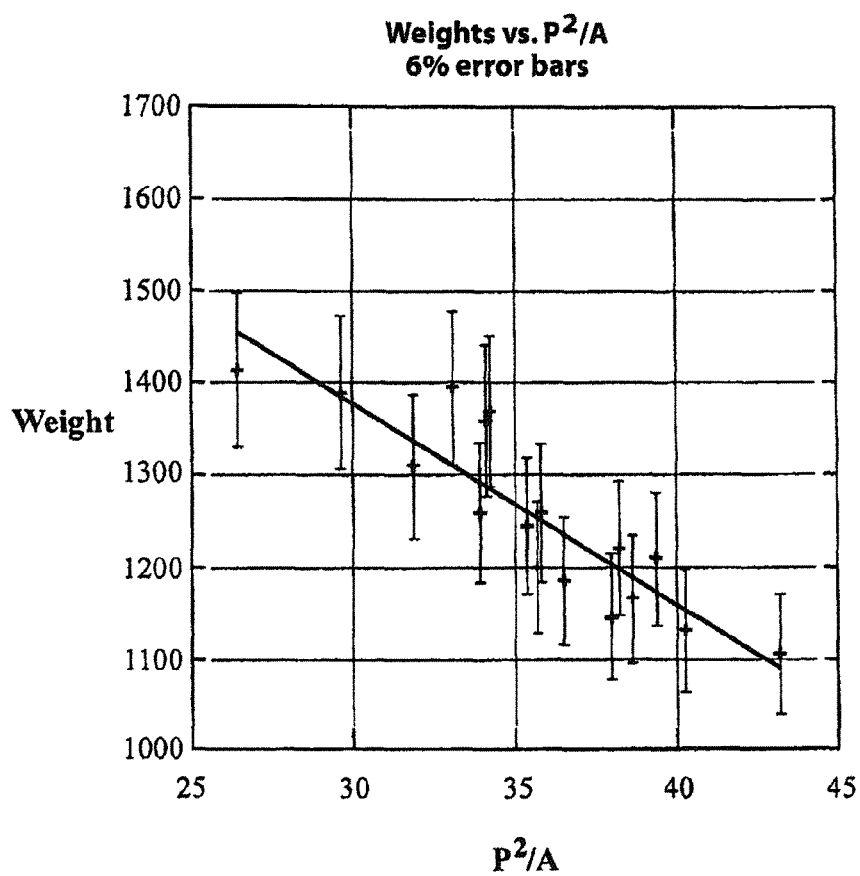
FIG. 7 comprises a graph of the weights of twenty-one representative cows, plotted against the quantity $P^2/A$ ("perimeter-squared divided by area"), according to various embodiments of the present invention.

Referring now to FIG. 7, a graph of the weights of twenty-one representative cows, plotted against the quantity $P^2/A$ ("perimeter-squared divided by area") is described. The least squares line for this sample is shown, together with 6% error bars. FIG. 7 illustrates a case of equation (1), with $\alpha\epsilon = 1$, two regression coefficients, $a_1$ and $a_2$, and $f$ the least-squares line as computed from previous data sets. Because all the cows used in this example varied in age between two and four years and were of the same breed, it may be seen that even this simple expression provides reasonably good estimates of weight (as verified by means of a large animal scale). All of the estimated weights lie within 6% of the true weight and a majority lie within 3%.

Figure 8:
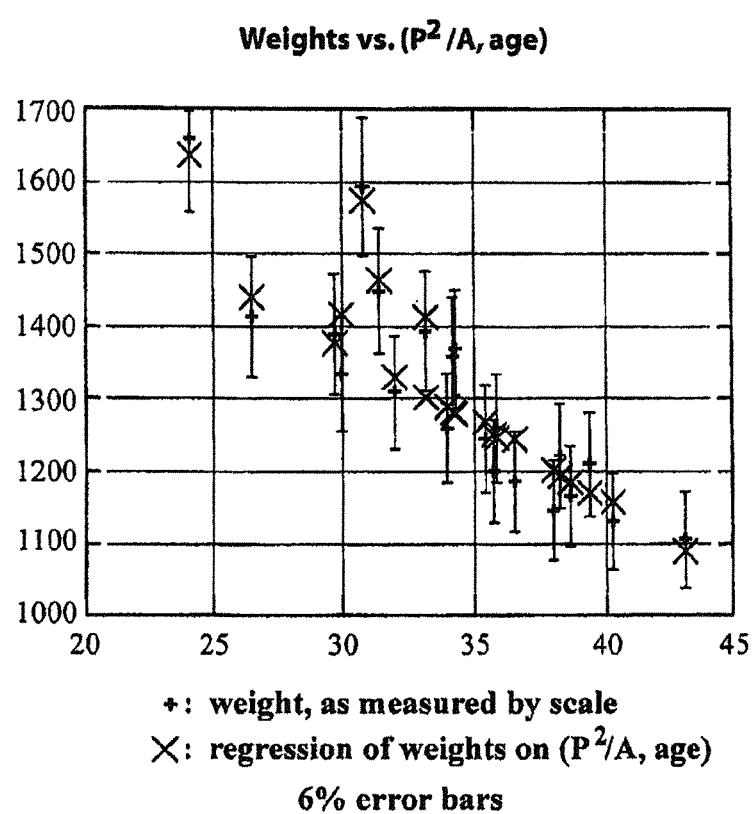
FIG. 8 comprises a graph that is similar to FIG. 7, but is a two-dimensional representation of a three dimensional chart according to various embodiments of the present invention.

FIG. 8 shows the weights of animals whose ages vary from less than two years to more than four years. As shown on the figure, symbols '+' and '×' are used to indicate weight as measured and weight as estimated, respectively. Equation (1) in this illustrative example, is used with $f$ linear, $\alpha = 1$ and four coefficients, $\{a_1, a_2, a_3, a_4\}$ for this more general case: □□□□

$$W = a_1 P^2/A + a_2(\text{age}^2) + a_3(\text{age}) + a_4 \quad (2)$$

FIG. 8 does not display the age-axis. The midpoints of each bar represent actual animal weights. The "X" symbols represent the values computed by regressing weights on a least squares surface in three dimensions. In this example, the introduction of age as an additional independent variable in the regression equation provides much better estimates of the weights of larger (and typically older) animals. For example, the equation used to generate all the estimates illustrated in FIG. 8 is $$-21.368(P^2/A) + 0.0007143(\text{age}^2) - 1.1726(\text{age}) + 2490.1, \quad (3)$$

where age is calculated in days since birth. Using just one animal measurement for the sake of illustration, $P^2/A$ is 26.5, age is 818, and the estimated weight is given by (3) as 1443 pounds, as compared to the measured weight of 1415. The average discrepancy for the 21 estimates in FIG. 8 is 3.02%.

Posterior views of the same animal over time will naturally vary. However the quantity $P^2/A$ is relatively robust to such variations within ordinary limits and within the 6% error tolerance that is claimed by this invention. Thus, as indicated at steps 209 and 210, if previous estimates of $P^2/A$ and weight that exist and are stored in the Animal Parameters database differ significantly from the current one, or if the current estimate appears to be in gross error, this can be used as a flag to review the image for an incorrectly recognized outline and/or examine the animal itself. Additionally, the target outline may differ sufficiently from the training set as to exceed the bounds of statistical variation. In that rare case, the training set is not sufficiently complete, and the current outline, if it appears true to the image, may be added to it, and the PDM re-computed.

Figure 9:
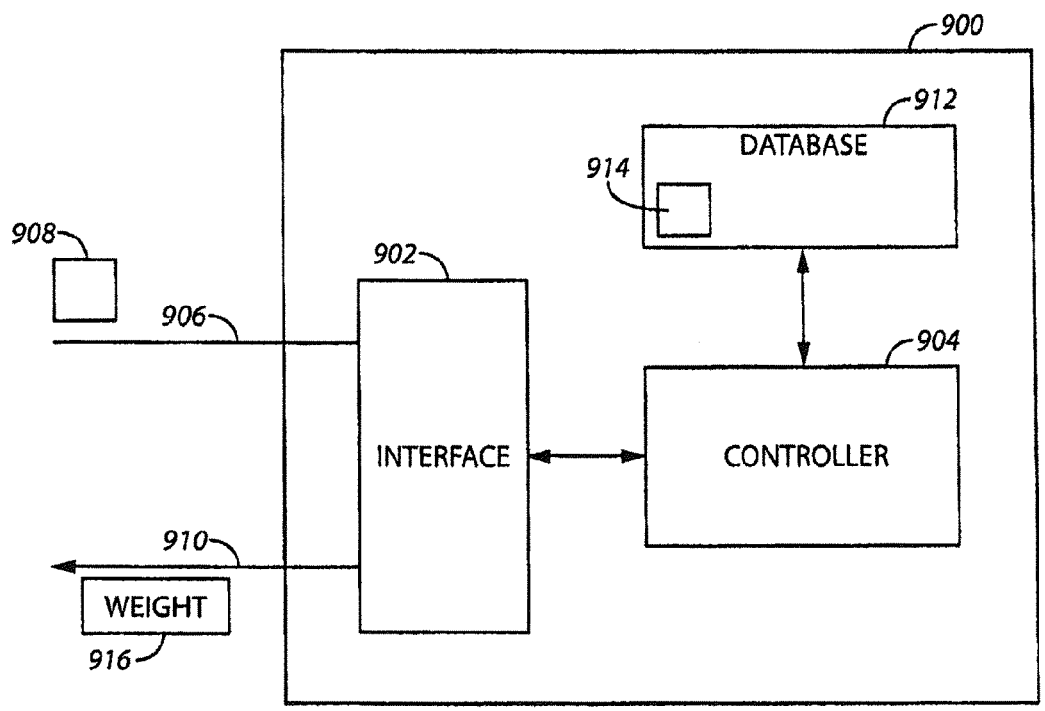
FIG. 9 comprises a block diagram of an apparatus for determining the weight of an animal according to various embodiments of the present invention.

Referring now to FIG. 9, an example of an apparatus 900 for determining the weight of an animal is described. The apparatus 900 includes an interface 902 and a controller 904. The interface 900 has an input 906 and the input 906 is configured to receive a digital image 908 of a target object. The image 908 includes a plurality of pixels and the target object is at least a portion of an animal. The portion of the animal is disposed in the image according to a predetermined disposition and the interface also has an output 910. The input 906 is further configured to receive at least one characteristic of an animal from a database 912 (that may or may not be a part of the apparatus 900) and the animal is the same species as the animal in the target image.

The controller 904 is coupled to the interface and the controller is configured to construct a model 914 (which may be stored in the database 912). The model 914 represents expected visual perimeter of the animal in the predetermined disposition. The controller 904 is further configured to identify the target object from the image 908 using the model 914 and according to an analysis of at least some of the pixels in the image 908. The controller 904 is configured to determine the perimeter of the animal using the identified target, to determine a weight 916 of the animal using the perimeter and at least one characteristic, and present the weight 916 at the output 910 of the interface 902.

It will be understood that many of the approaches described herein can be performed with computer instructions stored on a computer media and executed by a processing device, controller, microprocessor, or the like. For example, the functions performed by the controller 904 can be so-implemented.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of determining an animal weight, the method comprising:

receiving a digital image of a target object posterior portion of an animal taken from a posterior view of the animal, the digital image comprising a plurality of pixels;

analyzing at least some of the pixels of the digital image and determining a perimeter of an outline of the posterior portion of the animal; determining an area enclosed by the perimeter; and determining the weight of the animal using at least a square of the perimeter and the area enclosed by the perimeter.

2. The method of claim 1, wherein the determining the weight of the animal further comprises using at least a quotient obtained by dividing a square of the perimeter by the area enclosed by the perimeter.

3. The method of claim 1, wherein the determining the weight of the animal further comprises estimating the weight of the animal using according to at least a following algorithm: $W=f(P^2/A, \alpha; \{a_1, a_2, \ldots, a_m\})$; where W is the weight of the animal; P is the perimeter of the outline of the posterior portion of the animal; A is the area enclosed by the perimeter; $a_1$, $a_2$, and $a_m$ are regression coefficients, and $f$ is a least-squares line associated with the regression coefficients.

4. The method of claim 1 further comprising receiving a physical characteristic of the animal, wherein determining the weight of the animal comprises determining the weight of the animal using the perimeter and the area and the physical characteristic, and wherein the physical characteristic is selected from a group consisting of an age of the animal, a breed of the animal, animal markings, a previous weight, and identification tag information concerning the animal.

5. The method of claim 1, wherein the determining the perimeter of the outline of the posterior portion of the animal further comprises a single iteration of obtaining a current outline and calculating a new outline, the new outline being based upon at least one candidate boundary point from the digital image, and comparing the current outline with the new outline.

6. The method of claim 1, further comprising notifying a management service of the determined weight of the animal.

7. The method of claim 1, further comprising comparing the determined weight of the animal to an expected weight of the animal and determining whether the determined weight of the animal meets the expected weight of the animal.

8. The method of claim 7, further comprising changing a feeding program of the animal upon a determination that the weight of the animal does not meet the expected weight of the animal.

9. An apparatus for determining an animal weight, the apparatus comprising:

an interface having an input, the input configured to receive a digital image of a posterior portion of an animal taken from a posterior view of the animal, the digital image comprising a plurality of pixels, the interface having an output;

a controller coupled to the interface, the controller configured to:

identify the target objec4- posterior portion of the animal from the ~image; determine a perimeter of an outline of the posterior portion of the an-animal; determine an area enclosed by the perimeter;

determine the weight of the animal by using at least a square of the perimeter and the area enclosed by the perimeter; and present the weight at the output of the interface.

10. The apparatus of claim 9, wherein the controller is further configured to determine the weight of the animal by using at least a quotient obtained by dividing a square of the perimeter by the area enclosed by the perimeter.

11. The apparatus of claim 9, wherein the controller is further configured to determine the weight of the animal by estimating the weight of the animal using according to at least a following algorithm: $W=f(P^2A, \alpha; \{a_1, a_2, \ldots, a_m\})$; where W is the weight of the animal; P is the perimeter of the outline of the posterior portion of the animal; A is the area enclosed by the perimeter; $a_1$, $a_2$, and $a_m$ are regression coefficients, and $f$ is a least-squares line associated with the regression coefficients.

12. The apparatus of claim 9, wherein the input is configured to receive a physical characteristic of the animal, wherein determining the weight of the animal comprises determining the weight of the animal using the perimeter and the area and the physical characteristic, wherein the physical characteristic is selected from a group consisting of an age of the animal, a breed of the animal, animal markings, a previous weight, and identification tag information concerning the animal.

13. The apparatus of claim 9, wherein the controller is configured to determine the perimeter of the outline of the posterior portion of the animal via a single iteration of obtaining a current outline and calculating a new outline, the new outline being based upon at least one candidate boundary point from the digital image, and wherein the controller is further configured to compare the current outline with the new outline.

14. The apparatus of claim 9, wherein the controller is further configured to notify a management service of the determined weight of the animal.

15. The apparatus of claim 9, wherein the controller is configured to compare the determined weight of the animal to an expected weight of the animal and determine whether the determined weight of the animal meets the expected weight of the animal.

16. The apparatus of claim 15, wherein the controller is configured to change a feeding program of the animal upon a determination that the weight of the animal does not meet the expected weight of the animal.

17. The method of claim 1, wherein the perimeter of an outline of the posterior portion of the animal is defined at least in part by an outline of both back legs of the animal .

18. A method of determining an animal weight, the method comprising:

receiving a digital image of a target object, the image comprising a plurality of pixels, the target object being at least a portion of an animal, the at least a portion of the animal disposed in the image according to a predetermined disposition;

analyzing at least some of the pixels of the image of animal and determining a perimeter of an outline of the at least a portion of the animal;

determining an area enclosed by the perimeter;

determining the weight of the animal using at least the perimeter and the area enclosed by the perimeter, wherein the determining the weight of the animal further comprises using at least a square of the perimeter and the area enclosed by the perimeter.

\* \* \* \* \*

UNITED STATES PATENT AND TRADEMARK OFFICE
CERTIFICATE OF CORRECTION

PATENT NO. : 8,971,586 B2   Page 1 of 1
APPLICATION NO. : 14/207206
DATED : March 3, 2015
INVENTOR(S) : Gomas et al.

It is certified that error appears in the above-identified patent and that said Letters Patent is hereby corrected as shown below:

On the TITLE PAGE:
 Column 2, OTHER PUBLICATIONS, line 2, delete "Agricufture" and insert --Agriculture--.
In the CLAIMS:
 Claim 1, column 13, line 1, before "posterior" delete "target object".
 Claim 9, column 13, line 56, before "posterior" delete "target objec4-".
 Claim 9, column 13, line 57, after "from the" delete "~image;" and insert --digital image;--.
 Claim 9, column 13, line 58, before "animal;" delete "an-".
 Claim 11, column 14, line 8, delete "W=$f(P^2A$," and insert --W=$f(P2/A$,--.

Signed and Sealed this
Twenty-seventh Day of October, 2015

Michelle K. Lee
*Director of the United States Patent and Trademark Office*